G. W. Ladd,
Watch Case Band
No. 3,417.
Reissued May 4. 1869.
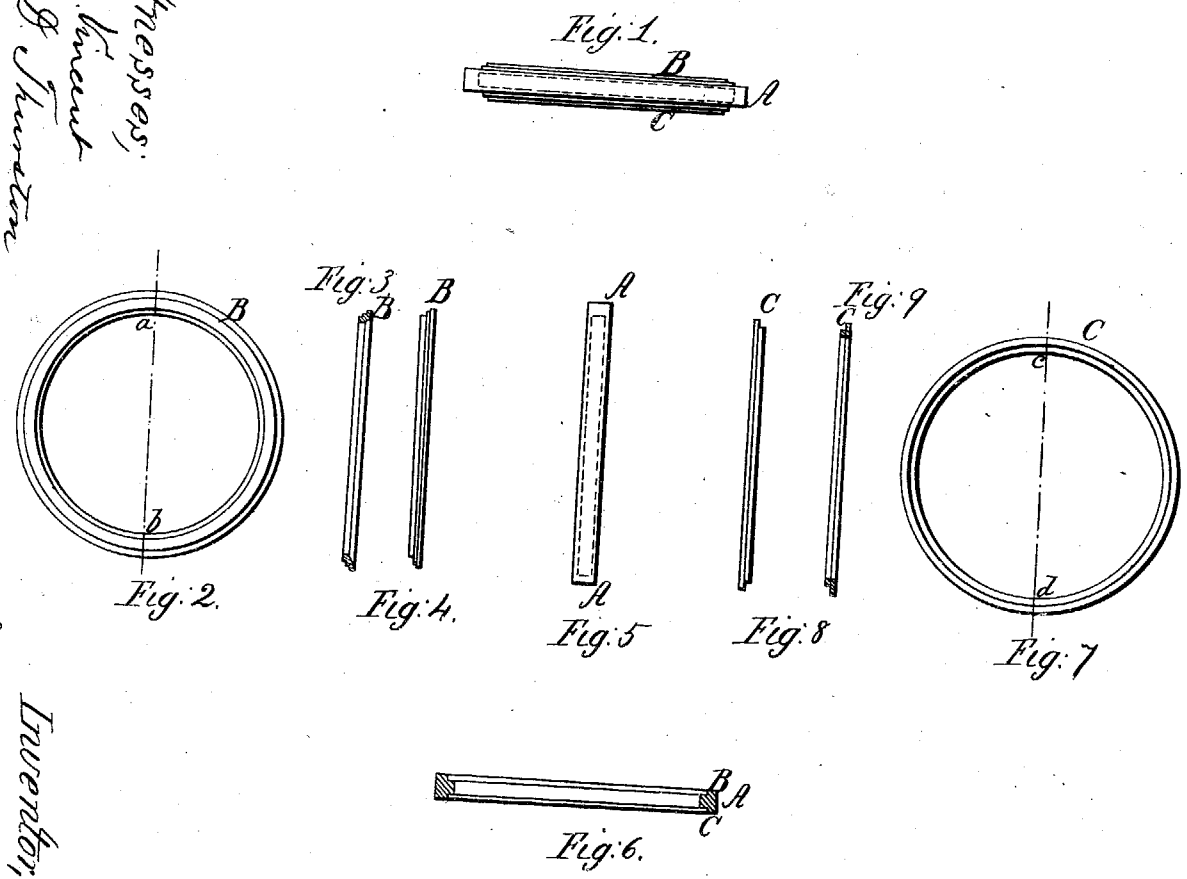
Witnesses;
W. B. Vincent
J. D. Thurston
Inventor;
George W. Ladd
N. PETERS, PHOTO-LITHOGRAPHER, WASHINGTON, D. C.

United States Patent Office.

GEORGE W. LADD AND JOHN A. BROWN, OF PROVIDENCE, RHODE ISLAND, ASSIGNEES, BY MESNE ASSIGNMENTS, OF GEORGE W. LADD.

*Letters Patent No.* 65,579, *dated June* 11, 1867; *reissue No.* 3,417, *dated May* 4, 1869.

IMPROVED METHOD OF MAKING SIDE BANDS OF WATCH-CASES.

The Schedule referred to in these Letters Patent and making part of the same.

*To all whom it may concern:*

Be it known that GEORGE W. LADD, of the city and county of Providence, in the State of Rhode Island, has invented a new and useful Improvement in Side Bands for Watch-Cases; and it is hereby declared that the following specification, taken in connection with the drawings making a part of the same, is a full, clear, and exact description thereof.

Figure 1 is an edge view of the side band of a watch-case.

Figures 2 to 9, inclusive, are different views of the parts of which it is composed.

The side band of a watch-case is that part to which the halves or lids are hinged, and which halves, when attached to the side band, make up the entire case.

The invention of the said LADD comprehends both the method by which the side band is made, and the article itself as a manufacture.

The side band is made up of three parts, a central portion, A, fig. 5, and two rims, B and C, figs. 4 and 8, one on each side of A, upon which are the sharp grooves into which the bevel or snapping-edge of the respective lids springs when the case is shut.

It is customary to finish the central band A with a milled surface, or otherwise ornament it, by the application of a revolving steel die, pressed against the band, while the latter, held upon a mandrel, is revolving in a lathe.

Heretofore these side bands have usually been made with their accompanying rims B and C, by striking up from sheet-metal, by means of suitable dies, each of the rims, with one-half of the centre band A, in one piece, and then soldering two halves so made together, the joint in such case being in a plane midway between the edges of the band A.

When side bands so made are milled, or otherwise ornamented, as above described, the effect is to stretch the metal of the central portion A, and consequently wring out of shape the rims B and C, so that it is a matter of some difficulty, and requiring much time and patience, to fit the lids or cases accurately thereto, and make a nice joint when the case is closed.

The present invention overcomes this difficulty, by constructing the side bands in three distinct parts, consisting of a centre band, A, fig. 5, and the side rims B and C, figs. 2, 4, 8, and 7.

Each of these parts is formed from wire of the appropriate size, then bent into a hoop, and soldered at the joint.

Each part should then be formed into shape by means of dies, and instead of making the rims B and C of the same diameter as the central band A, they should be as much larger as the band will stretch during the milling-operation.

After the band has been milled and trued off in the lathe, the rims are then to be soldered to its sides.

The advantages which result from the method described of making the article are, that the halves of the cases can be fitted with accuracy and dispatch to the side band, and make, when sprung into place by closing the case, perfect joints with the band.

The side band so produced is distinctive in its character as a manufacture. It admits of the employment of metals of different qualities and grades of fineness; as, for example, the central portion A, which is exposed to view, can be made of gold or silver, while the rims B and C may be made of harder and cheaper composition-metal.

This capacity of being formed from metals of different qualities is most important and valuable in the manufacture of watch and like cases from base metal, overlaid or plated with gold or silver. A heavier plate can be used for the central portion A than is required for the side rims, which are subject to less wear, but the article as a whole will be as durable, as beautiful, and practically as useful as if all its parts were made of equally costly stock.

What is claimed as the invention of the said GEORGE W. LADD, and is desired to be secured by Letters Patent, is—

1. The method of constructing the side band for watch-cases, substantially as herein described, for the purpose specified.

2. A side band for a watch-case, composed of a central band, A, and the side rims B and C, the article being of the character substantially as specified.

GEO. W. LADD,
JOHN A. BROWN,
*Assignees of George W. Ladd.*

Witnesses:
BENJ. F. THURSTON,
C. W. GREENE.